US007904960B2

(12) United States Patent
Ithal

(10) Patent No.: US 7,904,960 B2
(45) Date of Patent: Mar. 8, 2011

(54) SOURCE/DESTINATION OPERATING SYSTEM TYPE-BASED IDS VIRTUALIZATION

(75) Inventor: Ravishankar Ganesh Ithal, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1605 days.

(21) Appl. No.: 10/832,588

(22) Filed: Apr. 27, 2004

(65) Prior Publication Data
US 2008/0289040 A1    Nov. 20, 2008

(51) Int. Cl.
*H04L 9/00* (2006.01)
(52) U.S. Cl. .......... 726/23; 726/22; 726/24; 726/25; 713/180; 713/188
(58) Field of Classification Search .......... 713/1, 2, 713/188, 194, 180; 380/200, 201, 255, 277; 726/2, 22–25
See application file for complete search history.

(56) References Cited

U.S. PATENT DOCUMENTS

| 6,789,202 | B1 * | 9/2004 | Ko et al. ................... 726/23 |
| 7,174,566 | B2 * | 2/2007 | Yadav ......................... 726/26 |
| 2002/0035639 | A1 * | 3/2002 | Xu ................................. 709/238 |
| 2002/0069369 | A1 * | 6/2002 | Tremain .................... 713/201 |
| 2003/0004688 | A1 * | 1/2003 | Gupta et al. .............. 702/188 |
| 2003/0004689 | A1 * | 1/2003 | Gupta et al. .............. 702/188 |
| 2003/0145226 | A1 * | 7/2003 | Bruton et al. ............. 713/201 |
| 2003/0188189 | A1 | 10/2003 | Desai et al. ................ 713/201 |
| 2003/0212910 | A1 | 11/2003 | Rowland et al. ......... 713/201 |
| 2004/0193943 | A1 * | 9/2004 | Angelino et al. ............. 714/4 |
| 2004/0250169 | A1 * | 12/2004 | Takemori et al. .......... 714/38 |
| 2004/0260945 | A1 * | 12/2004 | Raikar et al. ............. 713/201 |
| 2005/0086522 | A1 | 4/2005 | Rowland et al. ......... 713/201 |
| 2006/0206615 | A1 * | 9/2006 | Zheng et al. .............. 709/229 |

OTHER PUBLICATIONS

Toby Miller; *Passive OS Fingerprinting: Details and Techniques*; available at http://www.sans.org/rr/special/passiveos.php; last viewed Apr. 13, 2004; eight pages.
Toby Miller; *Passive OS Fingerprinting: Details and Techinques (Part 2)*; available at http://www.sans.org/rr/special/passiveos2.php; last viewed Apr. 13, 2004; eight pages.

(Continued)

*Primary Examiner* — Joseph Thomas
*Assistant Examiner* — Joseph Pan
(74) *Attorney, Agent, or Firm* — BainwoodHuang

(57) ABSTRACT

Systems and methods for virtualizing network intrusion detection system (IDS) functions based on each packet's source and/or destination host computer operating system (OS) type and characteristics are described. Virtualization is accomplished by fingerprinting each packet to determine the packet's target OS and then vetting each packet in a virtual IDS against a reduced set of threat signatures specific to the target OS. Each virtual IDS, whether operating on a separate computer or operating as a logically distinct process or separate thread running on a single computer processor, may also operate in parallel with other virtual IDS processes. IDS processing efficiency and speed are greatly increased by the fact that a much smaller subset of threat signature universe is used for each OS-specific packet threat vetting operation.

16 Claims, 2 Drawing Sheets

OTHER PUBLICATIONS

Fyodor; *Remote OS detection via TCP/IP Stack Fingerprinting*; available at http://www.insecure.org/nmap/nmap-fingerprinting-article.html; last viewed Apr. 13, 2004; twelve pages.

Ofir Arkin; *ICMP Usage In Scanning, Version 3.0*; available at http://www.sys-security.com/-archive/papers/ICMP_Scanning_v3.0.pdf; last viewed Apr. 13, 2004; 218 pages.

Kyle Haugsness; *Intrusion Detection In Depth; GCIA Practical Assignment Version 3.0*; Dec. 2, 2001; available at http://ww.sans.org/rr/papers/23/835.pdf; last viewed Apr. 13, 2004; 88 pages.

Syed Yasir Abbas; *Introducing Multi Threaded Solution to Enhance the Efficiency of Snort*; Dec. 7, 2002; available at http://www.cs.fsu.edu/research/reports/TR-021204.pdf; last viewed Apr. 14, 2004; 83 pages.

Martin Roesch and Chris Green; *SnortTM Users Manual 2.2.0: The Snort Project*; Aug. 10, 2004; Sourcefire, Inc.; available at http://www.snort.org/-docs/snort_manual/; 89 pages.

Hervé Debar et al., "Towards a taxonomy of intrusion-detection systems" Computer Networks, Elsevier Science Publishers B.V., Amsterdam, NL, vol. 31, No. 8, Apr. 23, 1999, pp. 805-822.

Notification of Transmittal of the International Search Report and including the International Search Report, for PCT/US2005/011702, filed on Apr. 5, 2005. Total number of pp. 7.

* cited by examiner

SOURCE/DESTINATION OPERATING SYSTEM TYPE-BASED IDS VIRTUALIZATION

BACKGROUND

A typical computer networking system may include, among other things, an intrusion detection system (IDS) configured to monitor network traffic and to block attempted attacks on or intrusions into the protected network space. Such intrusion detection systems may include or coexist with various types of firewalls, packet monitors, and other devices that typically include intrusion sensing functions (e.g., advanced routers). These systems include both active and passive devices and are generally referred to as "sensors."

An IDS may include, among other things, a network interface for receiving packets, a packet filtering mechanism for determining whether or not to accept inbound packets, memory for storing threat signatures, and a network interface for transmitting (or forwarding) packets into the protected network. The aforementioned elements of an IDS may be implemented in either hardware or software or some combination of both.

An IDS sensor may also be virtualized. "Virtualized," as this term is used in the art, refers to virtualization, the practice of dividing the IDS functionality among multiple processes or logical elements each configured to operate in parallel with the others. These processes may run on separate processors (i.e., in separate pieces of hardware) or may run on a single processor in multiple threads. In this sense, virtualization may be thought of as another form of distributed processing: the functional or logical elements of the required process may be carried out in multiple locations, where "location" is understood as referring to both physical as well as logical separation. One of ordinary skill in the art will also recognize that virtualization does not necessarily require the division of IDS functionality into separate threads; the "feel" of providing multiple logical functions within a single physical device is all that is needed.

One conventional approach to IDS virtualization is to use to separate functionality (or to "virtualize") based on user-configured selection criteria such as packet IP prefix, domain name, VLAN, input interface, etc. In order to provide the same level of threat protection in each virtual IDS (or virtual IDS process), however, packets destined to be processed by a given virtual IDS sensor must be checked against signatures of vulnerabilities for all operating systems known to exist on the unprotected network. For typical cases where the unprotected network consists of the public Internet, this universe of operating systems is the universe of all known operating systems. Likewise, when the protected network is sufficiently large and diverse, the vulnerabilities in the destination host must include the vulnerabilities of all known operating systems as well.

In typical IDS systems, known vulnerabilities are stored in IDS memory as threat signatures, i.e., descriptive information formatted so that it may be rapidly compared by the IDS to packet content in order to directly determined whether each particular threat is or is not present in the packet. As the number of threats grows, so too must the set or universe of threat signatures. As each new threat is identified, any aspect or manifestation of that threat not common to a previously seen threat signature necessitates the definition of a new threat signature.

SUMMARY

There are several notable deficiencies to the above-described conventional approaches. For example, the prior art systems do not generally scale well as the number of threat signatures continues to increase. In addition, the packet latency introduced by comparing (or "vetting") each incoming packet against the universe of threat signatures causes a significant degradation in performance. In general, the vetting of each packet against each threat signature in the signature universe is slower and more inefficient than is desirable in modern high-speed, high throughput packet processing IDS sensors.

In contrast to the above-described conventional approaches, embodiments of the invention are directed to systems and methods for virtualizing IDS functions based on the operating system (OS) characteristics of each packet's source and/or destination host computers. This virtualization is accomplished by fingerprinting each packet to determine the packet's target OS and then performing a rapid packet vetting against a reduced set of threat signatures appropriate to that target OS. The "target OS" may be either the operating system of the packet's source host or the operating system of the packet's destination host. In some embodiments, information about either or both OSs may be used to select a reduced set of threat signatures.

The vetting process for each packet proceeds by comparing aspects of the packet such as, but not limited to, packet data payload, header flags, options, source IP address destination IP address, source port and/or destination port to the reduced threat signature set appropriate to the target OS for each particular packet.

Accordingly, each virtual IDS process, whether operating on a separate machine (computer), operating as a distinct thread running on a single computer or processor, or merely a logical distinction in functionality is thus able to operate in parallel with other virtual IDS processes, although parallel operation is not necessary to practice the present invention. In such an embodiment, each VIDS process performs packet vetting operations using the reduced threat signature set appropriate to the target OS as determined by the contents of each packet. IDS processing efficiency is greatly increased by the fact that a much smaller subset of threat signature universe is used for each packet threat vetting operation. Furthermore, as the universe of threat signatures increases without bound (as it is currently expected to do), IDS efficiency will not be greatly impacted since packets not subject to new vulnerabilities will not have to be vetted against those new threats. In fact, processing efficiency may be greatly enhanced by the ability of embodiments of the invention to greatly reduce the set of threat signatures that need to be searched for each packet. For example, it is well-known in the art that Apple Computer's OS X operating system is not vulnerable to the vast majority of attacks seen "in the wild" (i.e., known to be loose) today. Packets destined for this OS thus do not need to be vetted against threats to the Microsoft Windows OS, for example. Since the number of threat signatures is so much smaller, processing (including threat vetting) speed for OS X-destined packets is greatly increased.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present system are directed to techniques for intrusion detection system (IDS) virtualization based on packet target operating system (OS) characteristics and the tailoring of packet vetting to a reduced threat signature set. Tailoring, and the concomitant IDS virtualization, is based in turn on the use of passive and/or active packet fingerprinting to determine the packet's target operating system. The target OS may be, in some embodiments, a tuple consisting of the operating system of the packet's source host and the packet's destination host.

Figure 1:
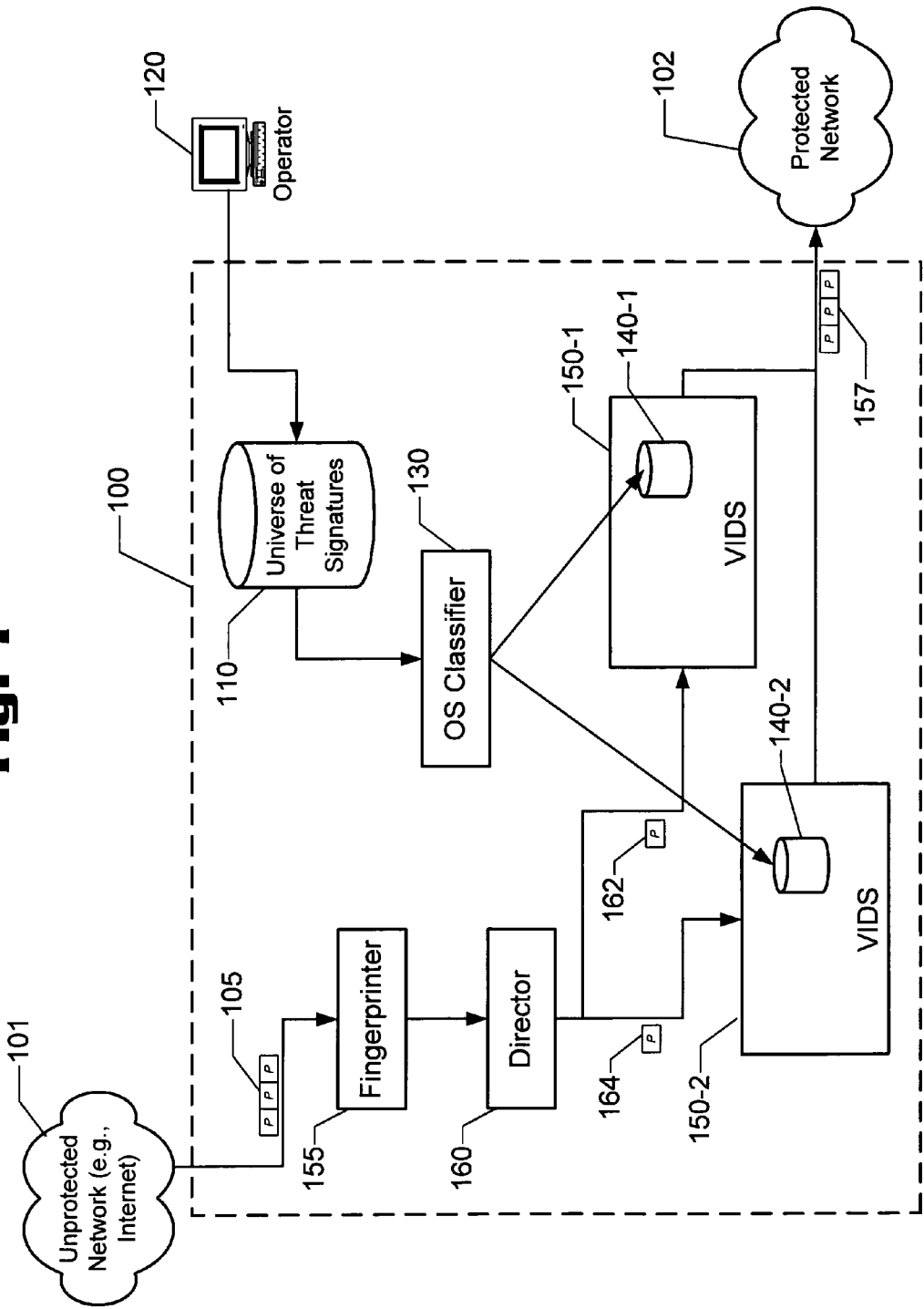
FIG. 1 is a high-level block diagram of an intrusion detection system configured according to one embodiment of the present invention.

FIG. 1 illustrates a virtualized intrusion detection system 100 configured according to one embodiment of the present invention. Viewed at a high level, system 100 consists of an interface to an unprotected network 101, the vetting/processing system components, and a second interface to a protected network 102. Additionally, an operator interface 120 allows an operator to load the universe of threat signatures.

Within the vetting/processing components of system 100, packets are processed by a fingerprinter, which in turn supplies fingerprinted packets to a director for switching or routing to one or more virtual IDS (VIDS) processes (which, as noted above, may be logically distinct in any of several ways). After vetting (with the aid of reduced threat signature sets 140) in the appropriate VIDS process (or set of VIDS processes), packets leave system 100 via the second network interface and enter protected network 102.

In one embodiment of the invention in particular, a stream of packets 105 from an unprotected network (such as, but not limited to, the public Internet) enters system 100 at fingerprinter 155 via a first network interface (not shown). Fingerprinter 155 looks at each packet to determine both the host operating system that sent the packet as well as the operating system of the host computer for which the packet is destined. This fingerprinting process, carried out on each packet in packet stream 105, is accomplished using either passive or active fingerprinting methods and techniques commonly used and well-known in the art. Passive fingerprinting techniques are discussed in detail in Toby Miller, *Passive OS Fingerprinting: Details and Techniques*, available at http://www.sans.org/rr/special/passiveos.php (last viewed Apr. 13, 2004), and *Passive OS Fingerprinting: Details and Techniques* (Part 2), available at http://www.sans.org/rr/special/passiveos2.php (last viewed Apr. 13, 2004), both incorporated herein by reference in their entireties. Active fingerprinting techniques are discussed in detail in (for example) Fyodor, *Remote OS detection via TCP/IP Stack Fingerprinting*, available at http://www.insecure.org/nmap/nmap-fingerprinting-article.html (last viewed Apr. 13, 2004), and Ofir Arkin, *ICMP Usage In Scanning, Version* 3.0, available at http://www.sys-security.com/archive/papers/ICMP_Scanning_v3.0.pdf (last viewed Apr. 13, 2004), both of which are incorporated herein by reference in their entireties. As the design and configuration of the hardware and/or software necessary to carry out either passive or active fingerprinting (or both) is well within the skill of an ordinary practitioner, implementation of specific fingerprinting techniques is not further discussed herein.

As each packet is fingerprinted, information denoting the source and destination operating systems is associated with the packet. This information may be stored, for example, in a temporary or scratchpad memory for use by director 160. Alternatively, target operating system data may be appended to or concatenated with the packet as it is passed to director 160.

In many implementations, the destination operating system (i.e., the operating system of the destination host) is of most use in evaluating the threat posed by packet; the "target OS" is the destination host OS because the most common threat is a threat to the packet's destination. In some cases, however, certain threat signatures are defined in terms of the source operating system, i.e., the "target OS" is the operating system of the host that sent the packet. For example, if the source operating system can be identified through fingerprinting as UNIX, then the fact that the packet contains a Microsoft Windows remote procedure call (RPC) indicates that a UNIX box may be attempting to penetrate a Windows system. Since a Windows RPC call would not normally come from a UNIX machine, it should be identified as a threat. Thus, some signatures may reference the source host OS as the target operating system.

Packets leaving fingerprinter 155 enter director 160 where, based on the target OS identified by fingerprinter 155, they are sent (i.e., redirected, switched, or routed, as those terms are known the art) to the appropriate virtual IDS (VIDS) process 150.

Although fingerprinter 155 and director 160 are depicted in FIG. 1 as separate functional elements, one of ordinary skill in the art will appreciate that these functions may be implemented in one or more devices and/or one or more to software processes. Accordingly, the implementation of virtualized IDS 100 is not limited to a particular distinction between or arrangement of hardware and/or software functionality and physical embodiment.

For the sake of clarity, FIG. 1 illustrates only two VIDS processes, 150-1 and 150-2, although in a typical implementation there may be many VIDS processes or units, each corresponding to a different target operating system. And, although each VIDS 150 is described as a process executing in software on a processor circuit, those skilled in the art will realize that the functions of a VIDS process may also be implemented in hardware (i.e., in a processor or other computer unit), in a single software process, or in a combination of hardware and software. Accordingly, the present invention is not limited to any particular implementation of the VIDS functionality.

By way of illustration, but not of limitation, VIDS 150-1 may be configured (in some embodiments of the invention) to compare individual packets 162 to a particular reduced threat signature set 140-1, corresponding to threats targeted at (for example) Windows XP. A second VIDS, 150-2, may be configured to compare packets 164 (which are directed to VIDS 150-2 because they share a target operating system that is different from that shared by packets 162) to a second reduced threat signature set 140-2. Reduced threat signature set 140-2 may list threats targeted at (for example) Windows 98. One of ordinary skill of the art will appreciate that many VIDS units 150 may be employed, each containing a reduced threat signature set 140 containing threat signatures appropriate to a different target operating system. Accordingly, the present invention is not limited to a particular number of VIDS units 150 and/or reduced threat signature sets 140.

Reduced threat signature sets 140 are formed by OS classifier 130 from a database or other memory or storage device 110 containing the universe of all known threat signatures.

The universe of threat signatures may be loaded into database 110 prior to activation of the virtualized IDS 100 by an operator using a conventional workstation or computer 120. Alternatively, although not shown, the universe of threat signatures 110 may be loaded by file transfer, scan, self-discovery or monitoring of network traffic, or any of the conventional means known in the art or yet to be discovered for creating and maintaining a database of threat signatures.

The process of forming discrete, reduced threat signature sets 140 from the universe of threat signatures 110 is accomplished by selecting signatures according to target operating system through conventional sorting methods and techniques. The threat signatures themselves are conventional text and/or digital data strings known and used in the art for packet-based threat vetting. The use and organization of such threat signatures are described in, for example, Kyle Haugsness, *Intrusion Detection In Depth: GCIA Practical Assignment Version* 3.0, (Dec. 2, 2001), available at http://www.sans.org/rr/papers/23/835.pdf (last viewed Apr. 13, 2004); Syed Yasir Abbas, *Introducing Multi Threaded Solution to Enhance the Efficiency of Snort*, (Dec. 7, 2002), available at http://www.cs.fsu.edu/research/reports/TR-021204.pdf (last viewed Apr. 14, 2004); and the *Snort Users Manual*, v. 2.1.2, available at http://www.snort.org/docs/snort_manual/, last viewed Apr. 23, 2004), all of which are incorporated herein by reference in their entireties.

The actions of operator 120 and OS classifier 130 required to load threat universe database 110 and to select or form the various reduced threat signature sets 140 may be accomplished at any time prior to activation of virtualized IDS 100 or even during operation, as when certain threat signatures must be updated without interrupting packet processing in virtualized IDS 100. Accordingly, although reduced threat signature sets 140 must be initially defined, those definitions need not be static and the present invention is not so limited.

Certain threats are known to be common to more than one target OS or platform. Accordingly, threat signatures representing these common threats are grouped into a separate reduced threat signature set 140 (not shown) that is necessarily applied (in another VIDS 150) to all packets 105. This parallel processing capability may be implemented (in some embodiments of the invention) in director 160 by providing the capability to direct packets to more than one VIDS 150 at the same (or substantially the same) time. This capability for parallel (near-simultaneous) processing of packets by more than one VIDS 150 provides a significant speed and throughput increase in virtualized IDS 100.

Packets 162 or 164 (in the two-VIDS 150 embodiment of FIG. 1) that match a threat signature are blocked within VIDS 150 and not allowed to pass through into protected network 102. Blocking may take any conventional form, such as but not limited to deletion, routing to /dev/null, packet marking and routing to a special process for alarming/reporting, or some other means of preventing the threatening packet from leaving virtualized IDS 100. Conversely, packets that do not match any threat signature form a vetted (or accepted) packet stream 157, which is then passed on (through conventional means) into protected network 102. Protected network 102 may consist of, for example but not by way of limitation, an intranet, LAN, MAN, or other relatively-closed network space secured and protected by virtualized IDS 100.

Figure 2:
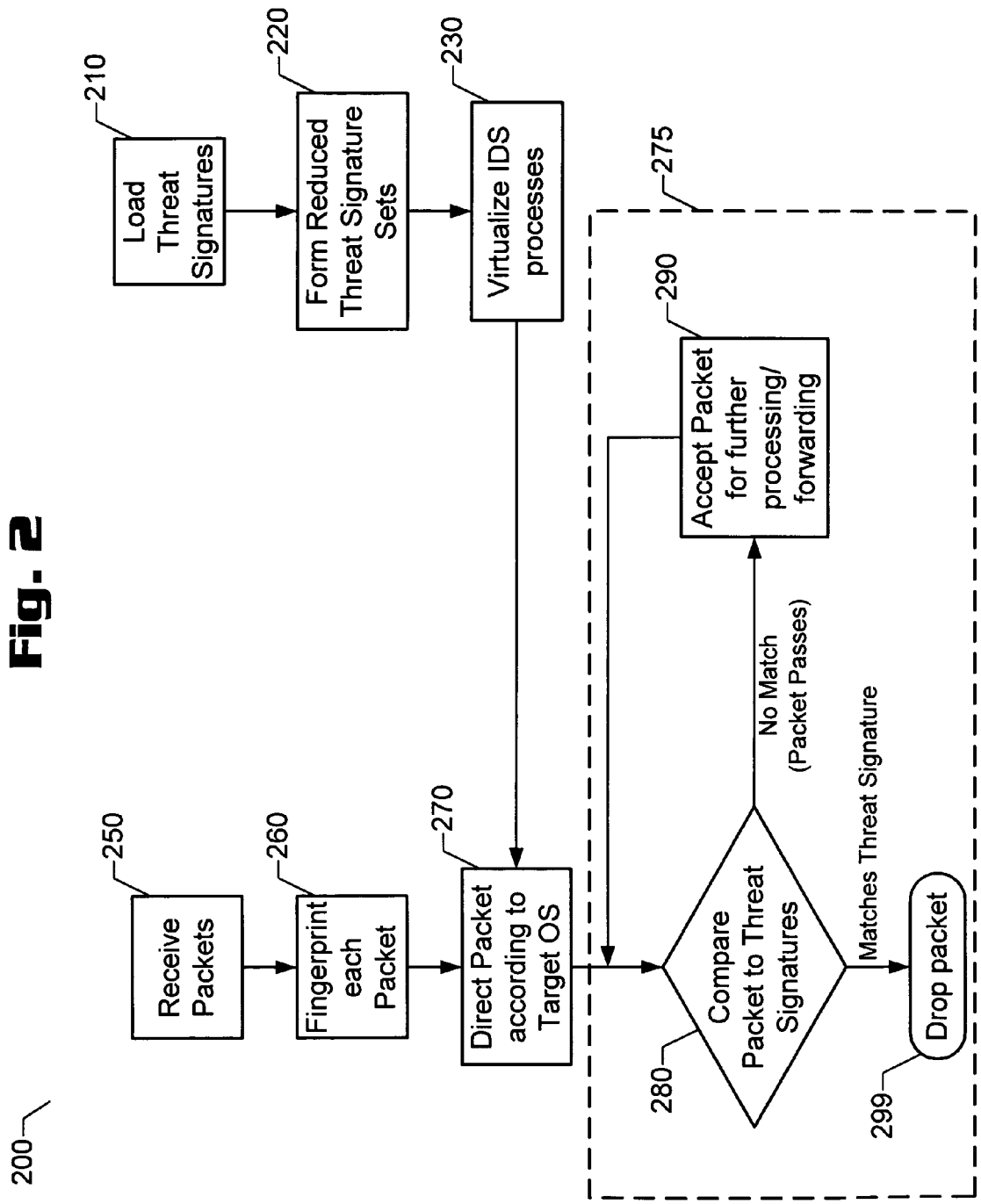
FIG. 2 is a high-level flowchart of the process of IDS virtualization, according to one embodiment of the present invention.

FIG. 2 illustrates one exemplary embodiment of a process 200 whereby the virtualized IDS receives packets, performs fingerprinting and packet redirection to an operating system-appropriate VIDS process, compares each packet to a specific reduced threat signature set, and passes or rejects packets accordingly.

Process 200 begins prior to virtualized IDS packet processing operations with the loading of threat signatures in step 210. Step 210 defines (or collects) the universe of relevant threat signatures in a database or other memory or storage element. The process of signature definition and/or collection (including editing and/or revising as required) may be performed, in some embodiments of the invention, by conventional techniques and processes well-known in the art. Process 200 next forms from the threat signature universe a number of reduced threat signature sets, based on target operating system, in step 220. As noted above, each threat signature is specific to a target operating system, i.e., the threats themselves are generally targeted at only a single operating system. For threat signatures that apply to multiple operating systems (for example, vulnerabilities that exist in more than one operating system), a reduced threat signature set is formed for threats common to two or more operating systems. Each reduced set of threat signatures is stored in a database or other memory structure using conventional processes.

Each database (or set) of operating system-specific reduced threat signatures is then used, step 230, to form a virtualized IDS process configured to compare or vet each packet presented to it. These packets begin to arrive at comparing step 280 once the virtualized IDS begins to process incoming packets in step 250.

The virtualized IDS receives packets 250 and fingerprints each one in step 260. Fingerprinting 260 may be an active process, such as by querying a DHCP server or by other active fingerprinting methods known in the art. Alternatively, fingerprinting 260 may be accomplished by passive means, such as (but not limited to) an analysis of the packet header's ACK, Flags, and/or Options fields and comparison of the values thereof to a set of OS-specific indicators. These indicators (or rules) permit the inference of the packet source host's and/or the packet destination host's operating system from the TCP and/or IP packet header field values.

After fingerprinting step 260 has determined the identity of the target OS for each packet, the packet is directed (in step 270) to a particular one of the several VIDS processes according to the packet's target OS. As discussed above, multiple VIDS processes may be created (in step 230) to match the number of distinct reduced threat signature sets formed in step 220.

In some implementations (not shown in FIG. 2), the process 200 checks whether the protocol carried by each packet can be officially "talked" (used, communicated, sent) by the source OS by further directing the packet (in step 270) to a second VIDS process for evaluating the source OS. The source OS VIDS checks only if the protocol is valid for the source OS, as further described below. A valid protocol passes the VIDS comparison for the source OS.

Within each VIDS process 275, each input packet is compared, step 280, to the corresponding reduced threat signature set for the packet's target OS. If the packet passes the comparison test, i.e., the packet does not match any threat signature in the reduced threat signature set, it is accepted for further processing and/or forwarding out of the VIDS process 275 in step 290. The VIDS process 275 then continues or loops back to comparison step 280 for the next packet presented.

If, on the other hand, the packet matches one of the threat signatures in the reduced threat signature set, the packet is dropped in step 299. "Dropped," in this context, refers to any of the various ways in which a bad packet may be processed in the intrusion detection context: the system may alternatively set an alarm, flag, reject, or null-route the packet, or otherwise suppresses its further transmission from the virtualized IDS.

It must be noted, although not depicted in FIG. 2 due to the need for clarity and simplicity in the drawing, multiple VIDS processes 275 (as represented by step 280, 290 and 299) may operate in parallel in some embodiments of the invention, thereby processing multiple packets at substantially the same time. In addition, more than one VIDS process 275 may process the same packet, as when both an OS-specific threat signature set and a common threat signature set are to be applied. Regardless of whether parallel processing is employed, however, the reduction in the threat signature set applied to each packet provides a significant performance benefit.

ALTERNATE EMBODIMENTS

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While this invention has been particularly shown and described with references to embodiments thereof, it will be understood by those skilled in the art that various changes in form and details may be made therein without departing from the spirit and scope of the invention as defined by the appended claims.

I claim:

1. A method of intrusion detection system (IDS) virtualization, comprising:
    receiving a stream of packets;
    fingerprinting each packet in the stream to identify at least one target operating system type, wherein the at least one target operating system type is an operating system of a destination host for each corresponding packet;
    directing each packet to a virtual IDS process associated with the operating system of the destination host identified for each corresponding packet;
    comparing each packet to a threat signature set corresponding to each identified operating system of the destination host in the virtual IDS process; a
    accepting each packet based on comparing each packet to the threat signature set;
    forming a reduced threat signature set from a received collection of threat signatures, the reduced threat signature set corresponding to a specific target operating system;
    forming the virtual IDS process from the reduced threat signature set corresponding to the specific target operating system;
    forming a common reduced threat signature set from a received collection of threat signatures, the common reduced threat signature set being common to at least two target operating systems; and
    forming a common virtual IDS process from the common reduced threat signature set corresponding to the at least two target operating systems;
    wherein directing each packet to the virtual IDS process associated with the operating system of the destination host identified for each corresponding packet comprises:
    directing at least one packet of the stream of packets to the virtual IDS process associated with the operating system of the destination host identified for the at least one packet; and
    directing the at least one packet to the common virtual IDS process when the common virtual IDS process is associated with the operating system of the destination host identified for the at least one packet, the virtual IDS process and the common virtual IDS process providing parallel and substantially simultaneous processing of the at least one packet.

2. The method of claim 1, wherein fingerprinting comprises active fingerprinting.

3. The method of claim 1, wherein fingerprinting comprises passive fingerprinting.

4. The method of claim 1, wherein the target operating system type is both the packet source host operating system and the packet destination host operating system.

5. The method of claim 1, wherein, when fingerprinting identifies more than one target operating system type and directing occurs at substantially the same time.

6. The method of claim 1, wherein:
    directing each packet to the virtual IDS process associated with the packet destination host operating system comprises directing each packet having an identified packet destination host operating system to a set of virtual IDS processes, each virtual IDS process of the set of virtual IDS processes being associated with the identified packet destination host operating system and each virtual IDS process of the set of virtual IDS processes configured to operate in a parallel and substantially simultaneous manner relative to each other; and
    comparing each packet to the threat signature set corresponding to each identified packet destination host operating system in the virtual IDS process comprises comparing, by each virtual IDS process of the set of virtual IDS processes in the parallel and substantially simultaneous manner relative to each other, the packets received to the threat signature set corresponding to the identified packet destination host operating system associated with the set of virtual IDS processes.

7. The method of claim 1, wherein accepting each packet based on said comparing comprises:
    when the packet fails to match a threat signature of the threat signature set, accepting the packet for further processing; and
    when the packet matches a threat signature of the threat signature set, suppressing further processing of the packet.

8. An apparatus for intrusion detection system virtualization, comprising:
    means for receiving a stream of packets;
    means for fingerprinting each packet in the stream to identify at least one target operating system type, wherein the at least one target operating system type is an operating system of a packet destination host for each corresponding packet;

means for directing each packet to a virtual IDS process associated with the operating system of the destination host identified for each corresponding packet;

means for comparing each packet to a threat signature set corresponding to each identified operating system of the destination host in the virtual IDS process;

means for accepting each packet based on comparing each packet to the threat signature set;

means for forming a reduced threat signature set from a received collection of threat signatures, the reduced threat signature set corresponding to a specific target operating system;

means for forming the virtual IDS process from the reduced threat signature set corresponding to the specific target operating system;

means for forming a common reduced threat signature set from a received collection of threat signatures, the common reduced threat signature set being common to at least two target operating systems; and means for forming a common virtual IDS process from the common reduced threat signature set corresponding to the at least two target operating systems;

wherein means for directing each packet to the virtual IDS process associated with the operating system of the destination host identified for each corresponding packet comprises:

means for directing at least one packet of the stream of packets to the virtual IDS process associated with the operating system of the destination host identified for the at least one packet; and means for directing the at least one packet to the common virtual IDS process when the common virtual IDS process is associated with the operating system of the destination host identified for the at least one packet, the virtual IDS process and the common virtual IDS process providing parallel and substantially simultaneous processing of the at least one packet.

9. The apparatus of claim 8, wherein means for fingerprinting comprise means for active fingerprinting.

10. The apparatus of claim 8, wherein means for fingerprinting comprise means for passive fingerprinting.

11. The apparatus of claim 8, wherein the target operating system type is both the packet source host operating system and the packet destination host operating system.

12. The apparatus of claim 8, wherein, when means for fingerprinting identifies more than one target operating system type and means for directing operates at substantially the same time.

13. A non-transitory computer-readable storage medium storing a computer program executable by a plurality of server computers, the computer program comprising computer instructions for:

receiving a stream of packets; fingerprinting each packet in the stream to identify at least one target operating system type, wherein the at least one target operating system type is an operating system of the packet destination host;

directing each packet to a virtual IDS process associated with the operating system of the destination host identified for each corresponding packet; comparing each packet to a threat signature set corresponding to each identified operating system of the packet destination host in the virtual IDS process;

accepting each packet based on comparing each packet to the threat signature set;

forming a reduced threat signature set from a received collection of threat signatures, the reduced threat signature set corresponding to a specific target operating system;

forming the virtual IDS process from the reduced threat signature set corresponding to the specific target operating system;

forming a common reduced threat signature set from a received collection of threat signatures, the common reduced threat signature set being common to at least two target operating systems; and forming a common virtual IDS process from the common reduced threat signature set corresponding to the at least two target operating systems;

wherein directing each packet to the virtual IDS process associated with the operating system of the destination host identified for each corresponding packet comprises: directing at least one packet of the stream of packets to the virtual IDS process associated with the operating system of the destination host identified for the at least one packet; and directing the at least one packet to the common virtual IDS process when the common virtual IDS process is associated with the operating system of the destination host identified for the at least one packet, the virtual IDS process and the common virtual IDS process providing parallel and substantially simultaneous processing of the at least one packet.

14. The non-transitory computer-readable storage medium of claim 13, wherein the computer instructions for fingerprinting comprise computer instructions for active fingerprinting.

15. The non-transitory computer-readable storage medium of claim 13, wherein the computer instructions for fingerprinting comprise computer instructions for passive fingerprinting.

16. An apparatus for intrusion detection system (IDS) virtualization, comprising:

a processor configured to:

receive a stream of packets;

fingerprint each packet in the stream to identify at least one target operating system type, wherein the at least one target operating system type is an operating system of a destination host for each corresponding packet;

direct each packet to a virtual IDS process associated with the operating system of the destination host identified for each corresponding packet;

compare each packet to a threat signature set corresponding to each identified operating system of the destination host in the virtual IDS process;

accept each packet based on comparing each packet to the threat signature set;

form a reduced threat signature set from a received collection of threat signatures, the reduced threat signature set corresponding to a specific target operating system;

form the virtual IDS process from the reduced threat signature set corresponding to the specific target operating system;

form a common reduced threat signature set from a received collection of threat signatures, the common reduced threat signature set being common to at least two target operating systems; and form a common virtual IDS process from the common reduced threat signature set corresponding to the at least two target operating systems;

wherein when directing each packet to the virtual IDS process associated with the operating system of the destination host identified for each corresponding packet, the processor is configured to:

direct at least one packet of the stream of packets to the virtual IDS process associated with the operating system of the destination host identified for the at least one packet; and direct the at least one packet to the common virtual IDS process when the common virtual IDS process is associated with the operating system of the destination host identified for the at least one packet, the virtual IDS process and the common virtual IDS process providing parallel and substantially simultaneous processing of the at least one packet.

\* \* \* \* \*